United States Patent
Schmucker

(10) Patent No.: US 8,267,407 B2
(45) Date of Patent: Sep. 18, 2012

(54) CYLINDER HEAD GASKET

(75) Inventor: Frank Schmucker, Ehingen (DE)

(73) Assignee: ElringKlinger AG, Dettingen (DE)

(*) Notice: Subject to any disclaimer, the term of this patent is extended or adjusted under 35 U.S.C. 154(b) by 893 days.

(21) Appl. No.: 12/313,075

(22) Filed: Nov. 17, 2008

(65) Prior Publication Data

US 2009/0267308 A1 Oct. 29, 2009

(30) Foreign Application Priority Data

Apr. 23, 2008 (DE) .......................... 10 2008 020 277

(51) Int. Cl.
*F02F 11/00* (2006.01)

(52) U.S. Cl. ........................................ 277/594; 277/593

(58) Field of Classification Search .......... 277/590–595, 277/598

See application file for complete search history.

(56) References Cited

U.S. PATENT DOCUMENTS

| | | | | |
|---|---|---|---|---|
| 4,759,585 | A | 7/1988 | Udagawa | 277/235 B |
| 5,280,928 | A * | 1/1994 | Ueta et al. | 277/595 |
| 5,568,932 | A * | 10/1996 | Tanaka et al. | 277/595 |
| 2002/0011709 | A1* | 1/2002 | Jinno et al. | 277/593 |
| 2002/0170521 | A1* | 11/2002 | Hilgert | 123/193.5 |
| 2002/0175478 | A1* | 11/2002 | Hilgert | 277/591 |
| 2003/0151210 | A1 | 8/2003 | Ueta et al. | 277/595 |
| 2004/0012154 | A1 | 1/2004 | Unseld et al. | 277/593 |
| 2004/0012155 | A1 | 1/2004 | Diez | 277/593 |
| 2004/0041352 | A1* | 3/2004 | Hohe et al. | 277/593 |
| 2004/0217552 | A1* | 11/2004 | Sueda | 277/592 |
| 2006/0097459 | A1* | 5/2006 | Hohe et al. | 277/593 |
| 2006/0145427 | A1* | 7/2006 | Sueda | 277/594 |
| 2006/0232017 | A1* | 10/2006 | Hamada et al. | 277/594 |
| 2007/0090608 | A1* | 4/2007 | Ueta | 277/593 |
| 2009/0166985 | A1* | 7/2009 | Hohe et al. | 277/592 |

FOREIGN PATENT DOCUMENTS

| | | |
|---|---|---|
| DE | 38 20 796 A1 | 1/1989 |
| DE | 197 08 970 A1 | 10/1998 |
| EP | 1 357 318 A2 | 10/2003 |
| EP | 1 217 268 B1 | 4/2006 |
| WO | WO 02/36996 A1 | 5/2002 |
| WO | WO 2006/061042 A1 | 6/2006 |

* cited by examiner

*Primary Examiner* — Gilbert Lee

(57) ABSTRACT

Cylinder head gasket with a gasket plate comprising a plurality of sheet metal layers and at least one combustion chamber opening, an inner layer being arranged in the gasket plate directly between two functional layers having sealing beads arranged one over the other, which enclose the combustion chamber opening and have bead feet lying in the planes of the functional layers and bead crests with which sealing beads of the two functional layers all project over the functional layers in a first direction extending perpendicularly to the gasket plane, at least one ring zone of the inner layer being clamped between the bead feet of the one functional layer and at least one bead crest of the other functional layer when the gasket is pressed; to minimize arching of this ring zone, it is stiffened and/or those ring zone regions against which at least one bead crest of one functional layer lies when the gasket is pressed are supported by bead feet of the other functional layer.

9 Claims, 5 Drawing Sheets

CYLINDER HEAD GASKET

The present disclosure relates to the subject matter disclosed in German application number 10 2008 020 277.0 of Apr. 23, 2008, which is incorporated herein by reference in its entirety and for all purposes.

BACKGROUND OF THE INVENTION

The invention relates to a cylinder head gasket with a gasket plate comprising a plurality of sheet metal layers and at least one combustion chamber opening and defining a gasket plane, an inner layer being arranged in the gasket plate directly between two functional layers having sealing beads arranged one over the other, which enclose the combustion chamber opening and have bead feet lying in the planes of the functional layers and bead crests with which the sealing beads of the two functional layers all project over the functional layers in a first direction extending perpendicularly to the gasket plane, at least one ring zone of the inner layer lying between the sealing beads being clamped between the bead feet of the one functional layer and at least one bead crest of the other functional layer when the gasket is installed.

Metal layers of a flat gasket consisting of a spring steel and having beads deformable in a resilient manner in their height for sealing around an opening to be sealed are referred to in technical terminology as functional layers.

Such a cylinder head gasket may also have a third functional layer arranged outside the set of layers formed by the two other functional layers and the inner layer.

Cylinder head gaskets of the kind defined hereinabove with a plurality of functional layers are suited, above all, for engines with a larger range of sealing gap dynamics (change over time in the width or breadth of the gap between the opposed sealing surfaces of a cylinder head and an engine block during operation of the engine). In these cylinder head gaskets, a beadless inner layer (usually called carrier sheet) is used to achieve a desired compression of the engine (compression in the cylinders) by a corresponding installation thickness of the cylinder head gasket (the installation thickness denotes the thickness of the gasket in the installed state when the engine is at a standstill).

Since in cylinder head gaskets of the kind defined at the outset, in which the sealing beads of the functional layers have, in accordance with standard practice, an approximately circular arc-shaped cross section, i.e., are formed as so-called full beads, a ring zone, surrounding a combustion chamber opening, of the carrier sheet, i.e., of the inner layer, lies between the convex side of a sealing bead of the one functional layer and the concave side of a sealing bead of the other functional layer, the crest of the sealing bead of the one functional layer is pressed, when the cylinder head gasket is installed, approximately in the shape of a line, i.e., with a large specific surface pressure (pressing force in relation to the contact surface) against the aforementioned ring zone of the carrier sheet, which causes an arching of the carrier sheet along this ring zone, as the carrier sheet above the crest of the sealing bead of the one functional layer is not supported by the other functional layer, but rather is able to enter the concave region of the sealing bead of the other functional layer. The spring-back potential of the sealing bead of the one functional layer is reduced by this deformation of the carrier sheet as pressing against the carrier sheet with a specific surface pressure that is required for a reliable sealing effect can no longer be brought about by the sealing bead on account of the arching of the carrier sheet when the width or breadth of the sealing gap between cylinder head and engine block increases over time during operation of the engine. The known cylinder head gaskets of the kind defined at the outset, therefore, have the disadvantage of allowing a smaller range of sealing gap dynamics if sealing against issue of combustion gases is to be reliably effected around a combustion chamber opening.

SUMMARY OF THE INVENTION

The object underlying the invention is to minimize this disadvantage of the prior art without it being necessary to increase the number of functional layers of a cylinder head gasket of the kind defined at the outset.

In accordance with a first solution to the underlying object, it is proposed, in accordance with the invention, that a cylinder head gasket of the kind defined at the outset be so designed that those regions of the ring zone of the inner layer against which at least one bead crest of one function layer lies when the cylinder head gasket is installed are supported by bead feet of the other functional layer. Then, in a cylinder head gasket according to the invention, the ring zone of the inner layer is no longer able to arch under the pressure of the crest of the sealing bead of the one functional layer, at least not to such a strong extent, in the direction towards the other functional layer, as is the case in the known cylinder head gaskets described hereinabove.

Embodiments of the cylinder head gasket according to the invention are particularly preferred, in which, instead of a so-called full bead projecting towards the inner layer and lying with its crest against the inner layer when the gasket is installed, the one functional layer comprises two half beads, which together form a bead of approximately rectangular or trapezoidal cross section, and whose crests lie (in relation to the inner layer) at least approximately opposite the bead feet of the sealing bead of the other functional layer, so that those ring-shaped regions of the inner layer against which the crests of the two half beads are pressed when the cylinder head gasket is installed are supported by the bead feet of the other sealing bead.

The radial spacings of the crests of the two half beads of the one functional layer from the center of the associated combustion chamber opening do not have to be exactly identical to the radial spacings of the two bead feet of the other functional layer from this center, i.e., the crests of the two half beads of the one functional layer do not have to lie exactly opposite the bead feet of the other functional layer. Even a spacing of the crests of the two half beads from each other in the order of magnitude of 50% of the spacing of the two bead feet from each other results in a significant increase in the spring-back potential of the rectangular or trapezoidal beads formed by the two half beads. However, embodiments are preferred, in which the spacing of the crests of the two half beads from each other is from approximately 80% to approximately 100% of the spacing of the two bead feet from each other, and, the underlying object is optimally accomplished when the spacing of the crests of the two half beads from each other is at least approximately equal to the spacing of the two bead feet from each other and also the radial spacings of the crests of the two half beads from the center of the associated combustion chamber opening are at least approximately identical to the radial spacings of the two bead feet from this center. In this connection, it is to be noted that the inner layer has a certain flexural rigidity, so that when the cylinder head gasket is installed, i.e., pressed, the inner layer sags only to a minimal extent on account of the crests of the two half beads pressed against it when these crests do not lie exactly opposite the bead feet of the other functional layer but, in relation to the bead feet, are offset somewhat in the direction towards the center between the two bead feet.

A similar effect to that with two half beads is achieved with full beads of significantly different width in the two functional layers adjacent to the inner layer, and, therefore, alternative embodiments of the cylinder head gasket according to the invention, are characterized by a first one of the two functional layers having a full bead whose crest lies against the ring zone of the inner layer when the cylinder head gasket is installed, by the second functional layer also having a full bead whose crest, in a plan view of the cylinder head gasket, lies (in relation to the inner layer) at least approximately opposite the crest of the full bead of the first functional layer, and whose bead feet lie against the ring zone of the inner layer when the cylinder head gasket is installed, and by the width of the full bead of the second functional layer being only a fraction of the width of the full bead of the first functional layer. In such a cylinder head gasket, the crest of the full bead of the first functional layer lies, owing to the large bead width, when the gasket is pressed, along a ring- and band-shaped region and not almost in the shape of a line against the inner layer, and this region is supported well by the bead feet of the full bead of the second functional layer as these bead feet are arranged at a short spacing from each other owing to the significantly smaller width of the full bead of the second functional layer. Embodiments are preferred, in which the width of the full bead of the first functional layer is at least twice as large as and, preferably, approximately three times larger than the width of the full bead of the second functional layer (the width of a full bead is to be understood as the spacing of the two bead feet of this bead from each other).

To allow for a large range of sealing gap dynamics, it may be recommendable to provide a cylinder head gasket according to the invention with a third functional layer. Such a cylinder head gasket is then characterized by the gasket plate comprising a third functional layer with a full bead or two half beads, which encloses or enclose the combustion chamber opening and whose crest or crests projects or project in the direction opposite to the first direction defined hereinabove over the third functional layer, the beads of the three functional layers being formed approximately mirror-symmetrically in relation to the surface of a circular cylinder which is coaxial with the combustion chamber opening, and the third functional layer being arranged outside the set of layers formed by the two other functional layers and the inner layer.

In accordance with a second solution to the underlying object, a cylinder head gasket of the kind mentioned at the outset is so designed, in accordance with the invention, that the inner layer has in the region of its ring zone a greater rigidity that counteracts sagging of the inner layer than in regions of the inner layer adjoining the ring zone.

In order to achieve a greater rigidity, in accordance with the invention, the following preferred measures are proposed:

In accordance with a first alternative, the inner layer has in the region of its ring zone a cross-sectional deformation which increases its flexural rigidity. Such a cross-sectional deformation can be achieved in a particularly simple way by the inner layer being subjected to an embossing operation.

In accordance with another alternative, the inner layer has a thin ring-shaped covering made of a material of high tensile strength, which covers its ring zone and is joined throughout its entire surface thereto. Here a thin covering is to be understood as one whose thickness is at most equal to the thickness of the inner layer, but preferably only a fraction of the thickness of the inner layer. Such a covering may, for example, be adhesively bonded, welded-on or sintered-on.

In accordance with a further alternative, the inner layer has an insert of higher flexural rigidity and/or with a higher modulus of elasticity forming its ring zone. Such an insert may take the form of a flat circular ring which is joined with a substance-to-substance bond, in particular, by welding, at its outer and its inner circumference to correspondingly shaped parts of the inner layer.

A third functional layer, as described hereinabove, may also be provided in a cylinder head gasket according to the invention, which is designed in accordance with the second solution.

In a cylinder head gasket according to the invention, the two or three functional layers form together with the inner layer a set of layers whose side facing the cylinder head or the engine block, when the cylinder head gasket is installed, is formed by a respective functional layer. It is recommended that these two functional layers be so designed that their sealing beads project in the direction towards the interior of the set of layers, so that the bead feet of the sealing beads of these two functional layers face the sealing surfaces of the cylinder head and the engine block. The risk of indentations or increased fictional wear in or on these sealing surfaces is thereby minimized, namely in comparison with cylinder head gaskets in which the crests of the sealing beads of the outer functional layers of the set of layers face the sealing surfaces of cylinder head and engine block.

Further features of the invention will be apparent from the appended claims and the following description and attached drawings of preferred embodiments of the cylinder head gasket according to the invention.

DETAILED DESCRIPTION OF THE INVENTION

Figure 1:
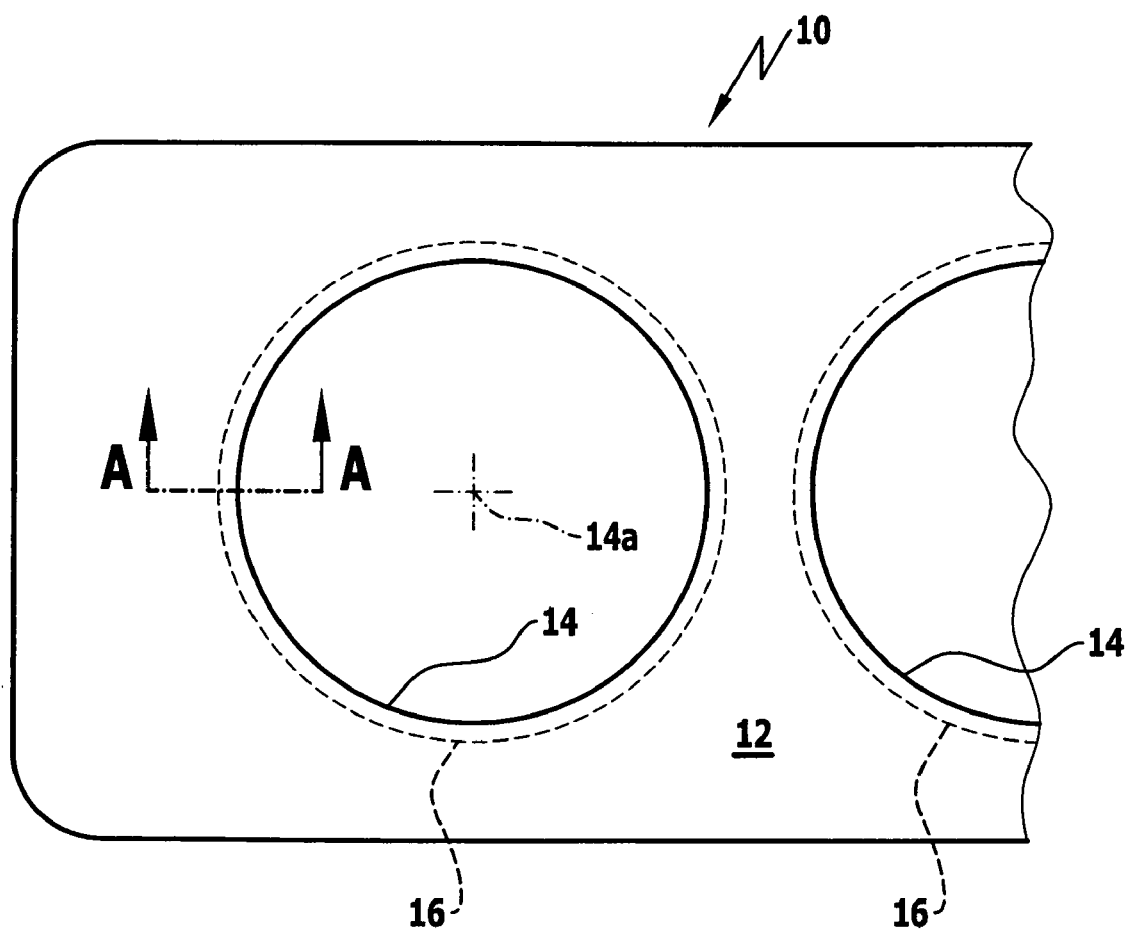
FIG. 1 shows a schematic and simplified plan view of part of a cylinder head gasket according to the invention for a multicylinder engine.

FIG. 1 shows part of a cylinder head gasket 10 according to the invention for a multicylinder engine, which is formed by a gasket plate 12 with a plurality of combustion chamber openings 14. In one of these combustion chamber openings 14, its center or axis has been designated 14a. As will be apparent from the following, the gasket plate 12 is made up of a plurality of sheet metal layers placed one on the other, some of which are provided with sealing beads designated 16 in FIG. 1, which surround the combustion chamber openings 14 and extend concentrically with the axis 14a of the respective combustion chamber opening. In FIG. 1, the sealing beads 16 are indicated only in broken lines because an upper, in accordance with FIG. 1, layer of the gasket plate 12 may be a smooth cover layer without any sealing beads.

Figure 2:
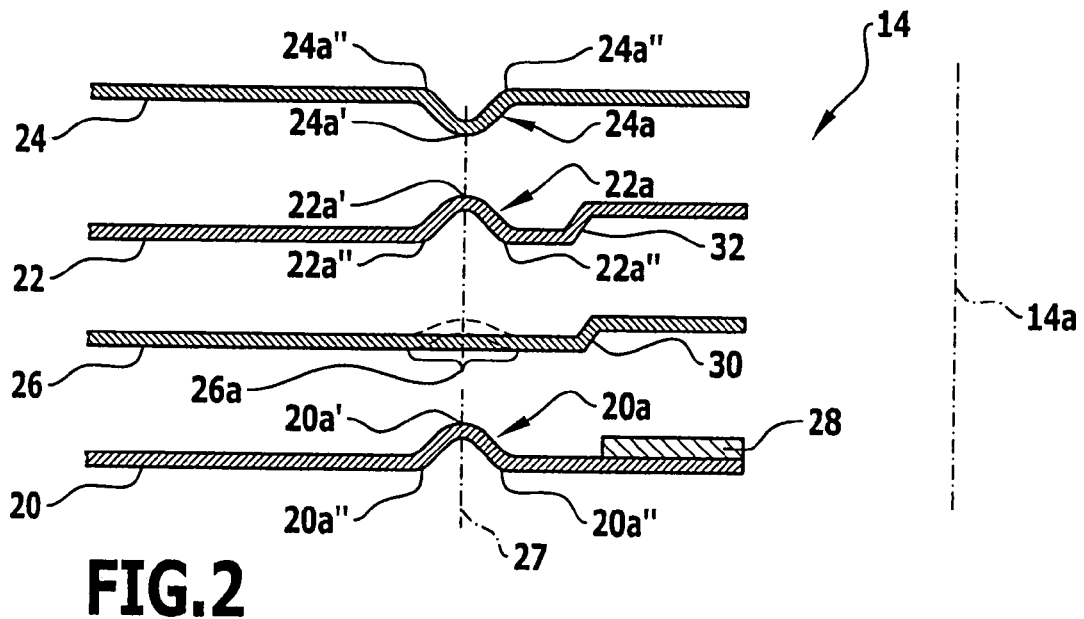
FIG. 2 shows a section taken along line A-A in FIG. 1, but through a known cylinder head gasket in the unpressed state.

The part of a known cylinder head gasket represented in section in FIG. 2 has four sheet metal layers arranged one on the other, namely three functional layers and one inner layer, referred to hereinbelow as carrier sheet, namely a first, a second and a third functional layer 20, 22, 24 and a carrier sheet 26 arranged between the two functional layers 20 and 22. In FIG. 2, a combustion chamber opening 14 is located to the right of the parts of the four layers shown in FIG. 2. Each of the three functional layers 20, 22 and 24 has a sealing bead 20a, 22a, 24a in the form of a so-called full bead, each of which has a bead crest 20a', 22a', 24a' and two bead feet 20a", 22a", 24a". The bead feet each lie in the plane of the respective functional layer. The beads 20a and 22a project in a first direction, namely upwards in accordance with FIG. 2, over the functional layer 20 and the functional layer 22, and the bead 24a projects in the direction opposite to this first direction, namely downwards in accordance with FIG. 2, over the functional layer 24. Furthermore, the sealing beads 20a, 22a and 24a lie on one another in such a way that all bead crests 20a', 22a' and 24a' lie on the surface 27 of a circular cylinder which extends concentrically with the axis 14a of the combustion chamber opening 14. Also, in this known cylinder head gasket all sealing beads 20a, 22a and 24a are of identical width (the bead width is to be understood as the spacing between the bead feet of the respective bead, which is measured in radial direction in relation to the axis 14a), so that all of the right, in accordance with FIG. 2, bead feet 20a", 22a" and 24a" lie on the surface of a circular cylinder just as the left, in accordance with FIG. 2, bead feet lie on the surface of another circular cylinder, with these two surfaces of circular cylinders also extending concentrically with the combustion chamber opening axis 14a. The three functional layers 20, 22 and 24 consist of spring steel sheets, whereas the carrier sheet 26 may consist of a sheet metal without any resilient properties. In keeping with the usual practice for flat metallic gaskets having beads which are deformable in a spring-elastic manner in their height, in the known cylinder head gasket shown in FIG. 2, too, the sealing beads 20a, 22a and 24a are protected against excessive flattening when the gasket is being installed and while the engine is in operation by deformation delimiters. In the case shown in the drawing, these consist of a so-called stopper 28 in the form of a welded-on sheet metal ring, and of offsets 30 and 32 in the carrier sheet 26 and the second functional layer 22, which like the stopper 28 extend in the shape of a circle around the combustion chamber opening axis 14a. As a result of the offsets 30 and 32, all three sealing beads 20a, 22a and 24a can be protected in the known manner with the aid of the single stopper 28 against excessive flattening, and, in this connection, it should be noted that in the embodiment of a known cylinder head gasket shown here in the drawing, all three sealing beads have the same height so long as the cylinder head gasket has not yet been installed, i.e., pressed.

In the installed state and while the engine is in operation, i.e., when the known cylinder head gasket shown in FIG. 2 is clamped between the sealing surfaces of a cylinder head and an engine block, the crest 20a' of the sealing bead 20a is pressed against the carrier sheet 26, and the crests 22a' and 24a' of the sealing beads 22a and 24a are pressed against each other. Since a cylinder head gasket must seal against the highest media pressures, namely against the combustion gas pressures, around a combustion chamber opening, the bead crests are pressed with high specific surface pressures against each other or against the carrier sheet 26. This causes deformation of a ring zone 26a of the carrier sheet 26, namely an arching of this ring zone upwards in accordance with FIG. 2, as indicated in broken lines in FIG. 2, because, in this known cylinder head gasket, on the one hand, the crest 20a' of the sealing bead 20a of the first functional layer 20 is pressed against a central region of the ring zone 26a and, on the other hand, this ring zone is only supported in the region of its radially inner rim and its radially outer rim from above by the bead feet 22a" of the sealing bead 22a of the second functional layer 22, and so the ring zone 26a can arch into the concave region of the sealing bead 22a. This arching has, in turn, the consequence that when the cylinder head gasket is installed, part of the height of the sealing bead 20a of the first functional layer 20 is lost for compensation of the sealing gap dynamics—sealing gap dynamics are to be understood as the change over time in the height or width of the sealing gap between the sealing surfaces of cylinder head and engine block, which is to be sealed by the cylinder head gasket—and, therefore, in time periods in which the sealing gap has its greatest width or breadth during operation of the engine, the specific surface pressure with which the crest 20a' of the sealing bead 20a of the first functional layer 20 is pressed against the carrier sheet 26 will no longer suffice to reliably seal against the issue of combustion gases.

Figure 3:
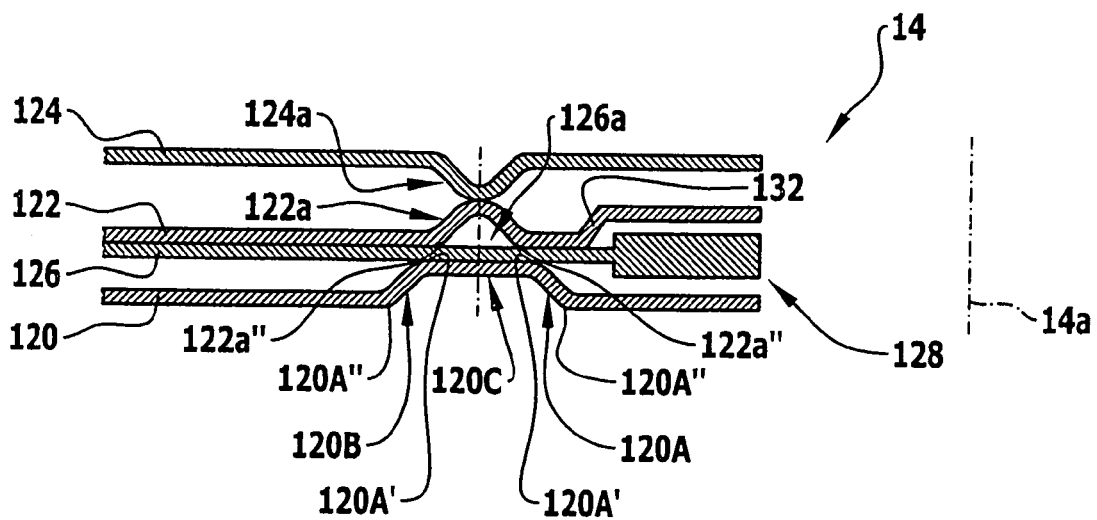
FIG. 3 also shows a section taken along line A-A in FIG. 1, which represents a first preferred embodiment of the cylinder head gasket according to the invention in the pressed state.

FIG. 3 now shows a first preferred embodiment of the cylinder head gasket according to the invention in a sectional representation corresponding to FIG. 2, and, in FIG. 3, insofar as possible, the same reference numerals were used as in FIG. 2, but increased by the number 100.

The cylinder head gasket according to the invention in accordance with FIG. 3 differs from the known cylinder head gasket in accordance with FIG. 2 by the following:

Apart from the fact that a stopper 128 is attached to the carrier sheet 126 and projects over both sides of this carrier sheet, which is why only a single offset, namely an offset 132, of a second functional layer 122 is required to protect with the single stopper 128 all of the sealing beads of the cylinder head gasket in accordance with FIG. 3 against excessive flattening, the cylinder head gasket according to the invention shown in FIG. 3 differs from the known cylinder head gasket in accordance with FIG. 2 in that instead of the usual full bead with an approximately circular arc-shaped cross section, the first functional layer 120 has two so-called half beads 120A and 120B, which each surround the combustion chamber opening 14 in the shape of a circular ring and form between them in the first functional layer 120 a plateau 120C which as a flat region of the functional layer 120, also surrounding the combustion chamber opening 14 in the shape of a circular ring, when the cylinder head gasket is installed, rests with surface-to-surface contact against the carrier sheet 126 and, in accordance with the invention, supports its ring zone 126a throughout the entire surface thereof. The two half beads 120A and 120B each have a bead crest 120A' and a bead foot 120A", and, in the particularly advantageous embodiment shown in FIG. 3, the bead crests 120A' lie quite exactly under the bead feet 122a" of the sealing bead 122a of the second functional layer 122. This has the advantage that those areas of the carrier sheet 126 on which the greatest pressing forces are exerted by the first functional layer 120 when the cylinder head gasket is installed, namely those regions of the carrier sheet 126 against which the bead crests 120A' lie, are directly supported by the bead feet 122a" of the sealing bead 122a of the second functional layer 122, and, therefore, when the cylinder head gasket according to the invention in accordance with FIG. 3 is clamped between an engine block and a cylinder head, the ring zone 126a of the carrier sheet 126 lying between the bead feet 122a" is not arched upwards in accordance with FIG. 3 by the first functional layer 120, with the consequence that the spring-back potential of the so-called trapezoidal bead formed by the two half beads 120A and 120B is not reduced by the installation of the cylinder head gasket and the pressing forces acting as a result on the cylinder head gasket in the way that is the case with the known cylinder head gasket in accordance with FIG. 2.

As the carrier sheet 126 is not fully deformable, this effect according to the invention is not lessened or at least not to any appreciable extent when the spacing of the two bead crests 120A' of the two half beads 120A and 120B from each other is somewhat smaller than the spacing of the two bead feet 122a" of the sealing bead 122a, in the form of the usual full bead, of the second functional layer 122 from each other, so that the bead crests 120A' no longer lie exactly opposite the bead feet 122a" in relation to the carrier sheet 126.

Otherwise, the full beads 122a and 124a of the second and third functional layers 122 and 124 of the cylinder head gasket according to the invention in accordance with FIG. 3 interact in the same way as is the case with the sealing beads 22a and 24a of the known cylinder head gasket in accordance with FIG. 2.

A further advantageous feature of the embodiment of the invention shown in FIG. 3 is to be seen in the fact that owing to the division of the sealing bead of the first functional layer 120 into two half beads 120A and 120B, the sealing bead of the first functional layer 120 no longer rests or is pressed more or less only in the shape of a line against the carrier sheet 126 but over a relatively large ring area which is formed by the upper side of the plateau 120C.

Figure 4:
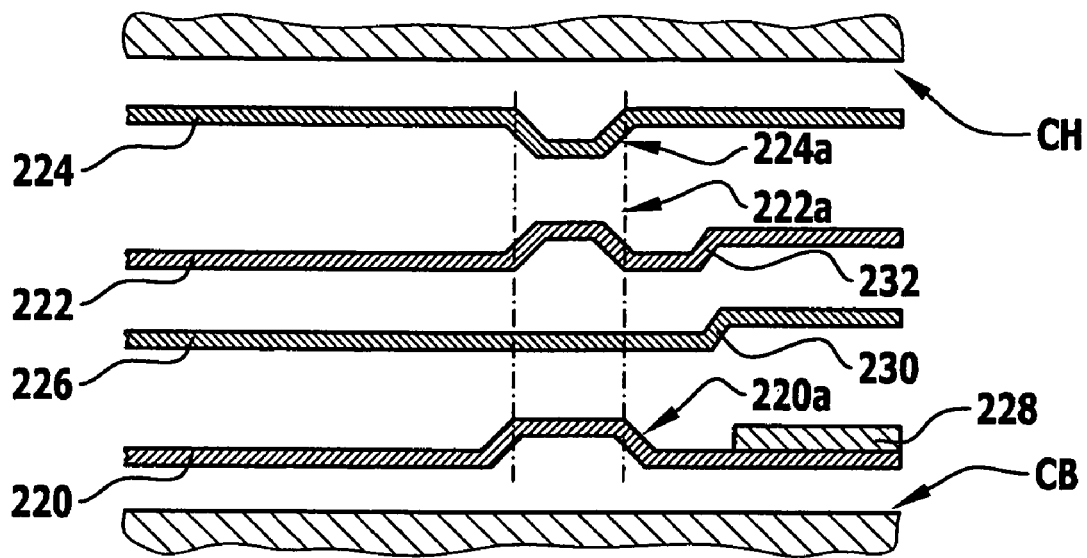
FIGS. 4 to 10 show representations, corresponding to FIG. 3, of further advantageous embodiments of the cylinder head gasket according to the invention, but in the unpressed state.
Figure 5:
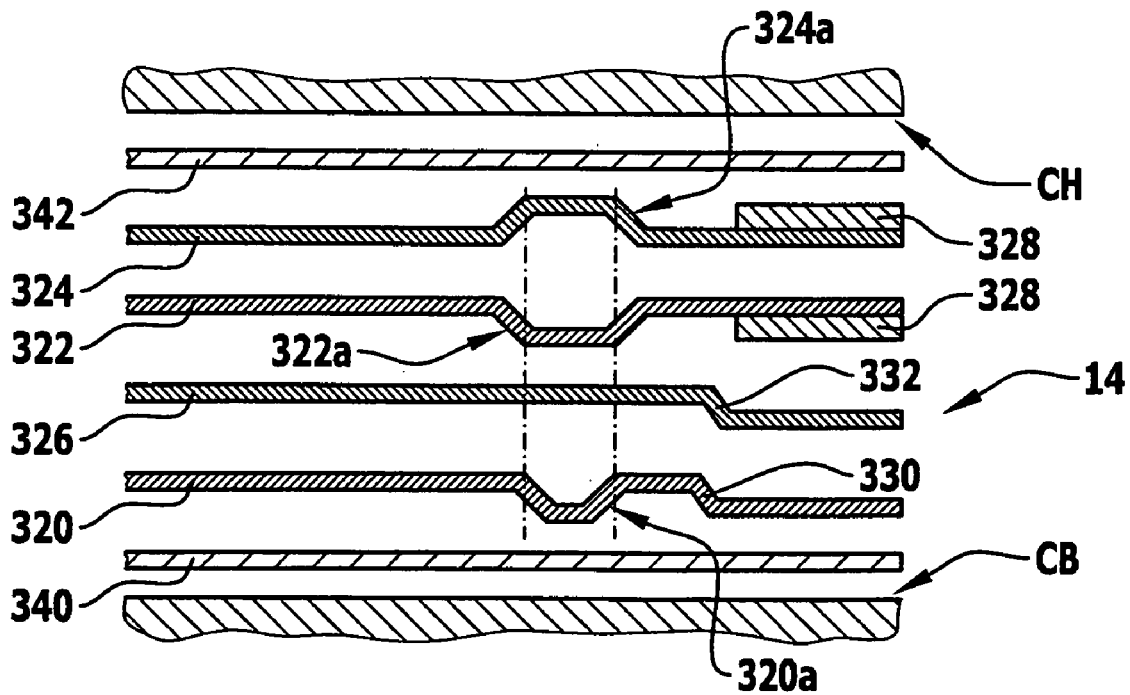

Since the modifications to the embodiment in accordance with FIG. 3 which are shown in FIGS. 4 and 5 are not of a basic nature, the embodiments in accordance with FIGS. 4 and 5 will only be described hereinbelow insofar as these differ from the embodiment in accordance with FIG. 3, and, insofar as possible, the same reference numerals are used in FIGS. 4 and 5 as in FIG. 3, but increased by the number 100 and 200, respectively.

In the cylinder head gasket in accordance with FIG. 4, the deformation delimiter for protection of the sealing beads against excessive flattening is designed in the same way as in the known cylinder head gasket in accordance with FIG. 2, so that a description of FIG. 4 is not required in this respect.

The fundamental difference between the cylinder head gaskets according to the invention in accordance with FIG. 3 and in accordance with FIG. 4 is merely that in the cylinder head gasket in accordance with FIG. 4 all three functional layers 220, 222 and 224 are provided with trapezoidal beads 220a, 222a and 224a, which are each formed by two half beads and a plateau located therebetween, as is the case in the gasket in accordance with FIG. 3 in the functional layer 120 with the two half beads 120A and 120B and the plateau 120C.

The beads of the two functional layers 220 and 222 are so designed and arranged that the bead crests of the two half beads of the trapezoidal bead 220a lie at least approximately under the two bead feet of the trapezoidal bead 222a of the functional layer 222, i.e., the two aforementioned bead crests and the two aforementioned bead feet lie exactly or at least approximately opposite one another in relation to the carrier sheet 226.

FIG. 4 also shows parts of a cylinder head CH and a cylinder block CB between which the cylinder head gasket is clamped when cylinder head screws, not shown, for securing the cylinder head to the cylinder block are tightened—however, FIG. 4 shows the cylinder head gasket still in the unpressed state.

Regarding the cylinder head gaskets shown in FIGS. 3 and 4, it should also be noted that these both exhibit the following advantageous feature: The functional layers 120 and 124 and 220 and 224 forming the two main surfaces of the cylinder head gasket have sealing beads projecting in the direction towards the interior of the set of layers, which is formed by the various layers of the gasket plate, so that only bead feet are located on the two outer main surfaces of the cylinder head gasket. This has the advantage that the pressing forces acting on a sealing bead or exerted by a sealing bead, in the case of each sealing bead, are distributed onto two sealing lines along which the sealing bead lies with its bead feet against a sealing surface of the cylinder head or the engine block—if the sealing beads were to point outwards with their crests, the specific surface pressure forces between the sealing beads and the sealing surfaces of cylinder head and engine block would be significantly greater, which might involve the risk of the sealing beads causing indentations and/or frictional wear phenomena on the sealing surfaces of cylinder head and/or engine block during operation of the engine.

Therefore, the embodiment of a cylinder head gasket according to the invention shown in FIG. 5 has in addition to three functional layers and a carrier sheet two smooth so-called cover sheets which cover the sealing beads of a lowermost and an uppermost functional layer, which project in the direction of the sealing surfaces of cylinder head and engine block.

As FIG. 5 shows, the following layers follow one after the other (from the bottom to the top in accordance with FIG. 5) in the gasket plate of this cylinder head gasket: a smooth cover plate 340, a first functional plate 320, a carrier sheet 326, a second functional layer 322, a third functional layer 324 and a further smooth cover sheet 342. The three functional layers are provided with sealing beads 320a, 322a and 324a in the form of trapezoidal beads. The sealing beads 320a and 322a project in the same direction over their functional layers, whereas the sealing bead 324a projects in the opposite direction over the function layer 324. In the embodiment in accordance with FIG. 5, the two functional layers 322 and 324 are provided with stoppers 328 on sides facing away from each other, and, therefore, the functional layer 320 and the carrier sheet 326 are provided with offsets 330 and 332 which in accordance with FIG. 5 point downwards.

It is essential that the two bead crests of the sealing bead 322a in the form of a trapezoidal bead lie at least approximately opposite the two bead feet of the sealing bead 320a in relation to the carrier sheet 326.

As is apparent from the foregoing, in cylinder head gaskets according to the invention designed in accordance with the first solution, the second functional layer may have a full bead or two half beads, with the two bead feet of the full bead or the two half beads lying at least approximately opposite the bead crests of the two half beads of the first functional layer. Similarly, the third functional layer may have a full bead or two half beads.

In cylinder head gaskets according to the invention designed in accordance with the first solution, which have a third functional layer, the latter may be arranged adjacent to that one of the two other functional layers whose bead feet lie against the inner layer (see, for example, FIG. 4) when the cylinder head gasket is installed. The third functional layer and one of the two functional layers then preferably form outer layers of the cylinder head gasket, and, in particularly advantageous embodiments, the third functional layer forms the main surface of the cylinder head gasket which is to face a cylinder head, above all, when the cylinder head is made of a light metal alloy. Alternatively, the third functional layer may be arranged adjacent to that one of the two other functional layers whose bead projects in the direction towards the inner layer (see, for example, FIG. 5).

If a cylinder head gasket according to the invention designed in accordance with the first solution has three functional layers and an inner layer, it may be advantageous to provide two outer layers, between which the three functional layers and the inner layer are arranged, and which are flat at least in those outer layer regions which cover the beads of the adjacent functional layers (see, for example, FIG. 5). Such embodiments are recommended, above all, for cylinder head gaskets in which the beads of the functional layers adjacent to the two outer layers project in the direction towards the cylinder head or the engine block.

Figure 6:
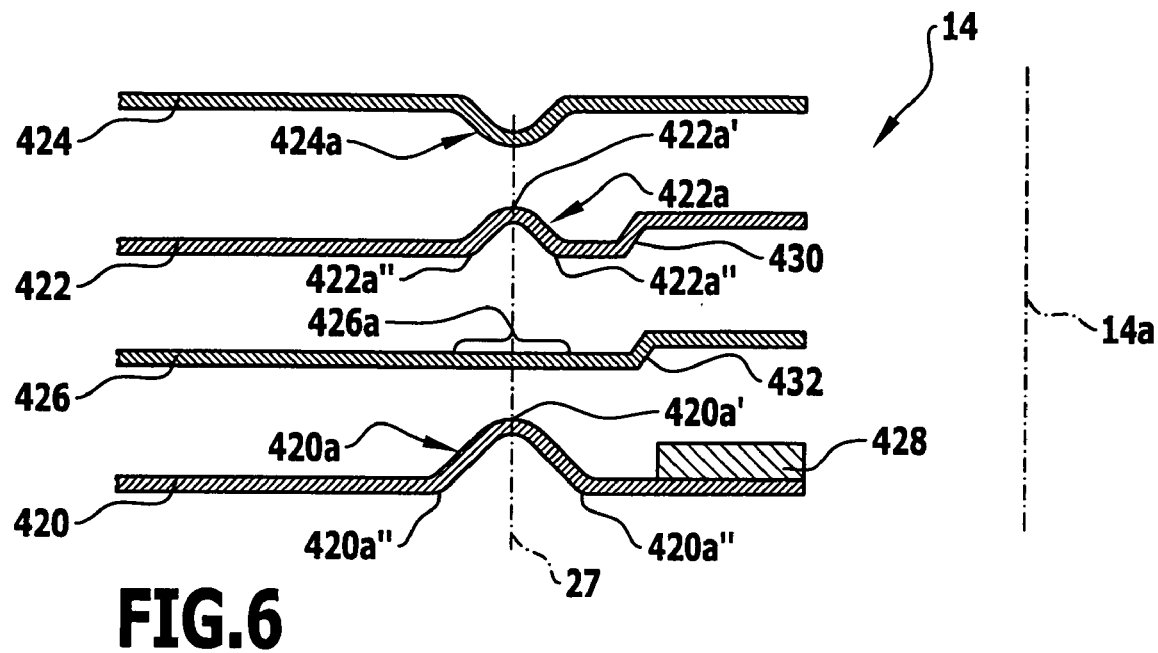

FIG. 6 shows by way of example how the first solution may be realized by a measure different from the division of a full bead into two half beads. FIG. 6 shows a cylinder head gasket according to the invention, which also has a third functional layer, even when such a third functional layer is advantageous, but not absolutely necessary.

The cylinder head gasket in accordance with FIG. 6 has a first functional layer 420, adjacent to this a carrier sheet 426, adjacent to this a second functional layer 422 and finally a third functional layer 424. All three functional layers have full beads with the usual cross-sectional profile of approximately circular arc shape as sealing beads. A sealing bead 420a of the first functional layer 420 points with its bead crest 420a' in the direction towards the carrier sheet 426 and has a relatively large width, which is to be understood as the spacing between the two bead feet 420a" of the sealing bead 420a measured in radial direction in relation to the axis 14a of the combustion chamber opening 14. Owing to the relatively large width of the sealing bead 420a, its bead crest 420a' lies, when the cylinder head gasket is installed, i.e., pressed, against the carrier sheet 426 via a region enclosing the axis 14a in the shape of a circular ring, which is rather band-shaped than line-shaped and has a relatively large width (again measured in radial direction in relation to the axis 14a).

In accordance with the invention, the second functional layer 422 is provided with a sealing bead 422a whose width is only a fraction of the width of the sealing bead 420a, whose bead crest 422a' points away from the carrier sheet 426 and whose bead feet 422a", which owing to the relatively small width of the sealing bead 422a lie relatively close together, support a ring zone 426a of the carrier sheet 426 when the bead crest 420a' is pressed against a central region of the ring zone 426a. Since the carrier sheet 426 possesses a certain inherent stiffness, the bead feet 422a" pressed against the rim regions of the ring zone 426a prevent the carrier sheet 426 from being arched upwards (in accordance with FIG. 6) to any appreciable extent by the sealing bead 420a and from entering the cavity formed by the concave side of the sealing bead 422a when the cylinder head gasket is installed.

A sealing bead 424a of the third functional layer 424 projects in the direction towards the second functional layer 422 and lies with its bead crest against the bead crest 422a' of the sealing bead 422a when the cylinder head gasket is installed and pressed. The sealing bead 424a may have the same dimensions (width and height) as the sealing bead 422a, but it may also be wider and/or higher than the sealing bead 422a.

All sealing beads 420a, 422a and 424a are advantageously designed and arranged mirror-symmetrically in relation to the surface 27 of a circular cylinder which extends concentrically with the axis 14a of the combustion chamber opening 14. All crests of the sealing beads 420a, 422a and 424a then lie one over the other. In principle, the two sealing beads 422a and 424a could, however, also be offset somewhat from one another in radial direction in relation to the axis 14a.

In the cylinder head gasket according to the invention shown in FIG. 6 deformation delimiters are again provided to prevent the sealing beads from being excessively flattened when the cylinder head gasket is being installed and/or while the engine is in operation and from thereby being subjected to the risk of permanent breakages. For this purpose, a circular ring-shaped stopper 428 is attached to the first functional layer 420, and the second functional layer 422 and the carrier sheet 426 have offsets 430 and 432, respectively, so as to be able to protect all three sealing beads with only a single stopper.

An essential feature of a cylinder head gasket according to the invention which is designed in accordance with the basic principle shown by way of example in FIG. 6 is, therefore, that the two bead feet of the one functional layer which are pressed against the carrier sheet 426, in comparison with the width of the contact surface of the bead crest of the other functional layer, which is pressed against the carrier sheet, lie so close together that the carrier sheet cannot be made to arch or at least not to any appreciable extent by this bead crest when the cylinder head gasket is installed or while the engine is in operation.

It should be noted that the sealing bead 424a and possibly even the sealing bead 422a as well may each be formed by two half beads.

The second solution to the object underlying the invention will now be explained with reference to the cylinder head gaskets according to the invention shown schematically in FIGS. 7 to 10.

Figure 7:
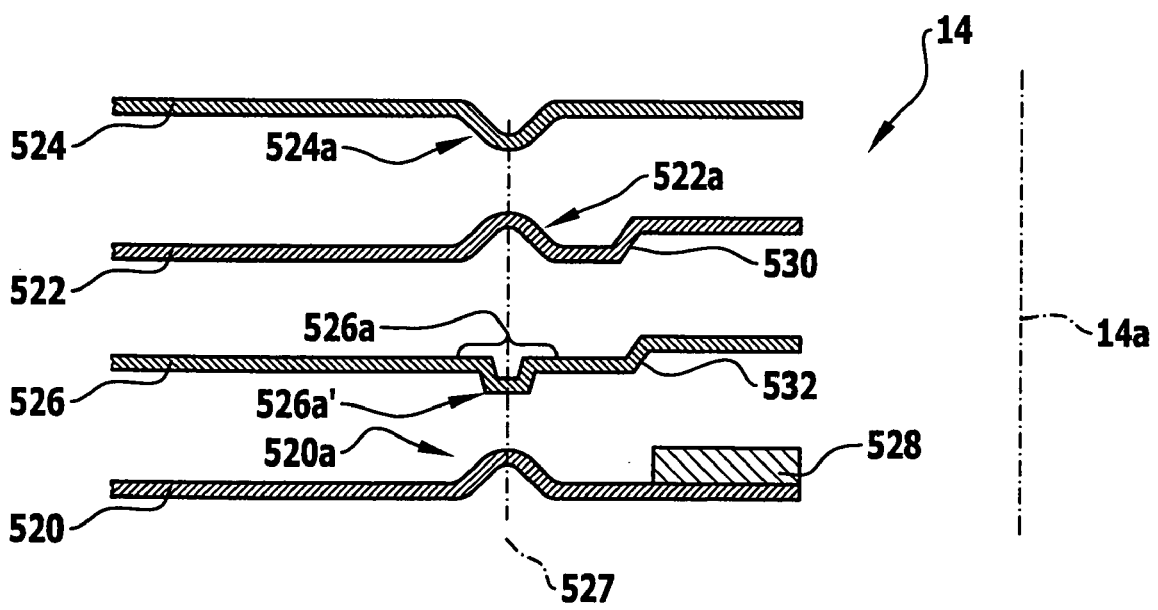

The cylinder head gasket shown schematically in FIG. 7 differs from that in accordance with FIG. 4 firstly only in that the functional layers have sealing beads in the form of full beads designed in the usual way instead of sealing beads in the form of trapezoidal beads, and, therefore, the same reference numerals were used in FIG. 7 as in FIG. 4, but increased by 300.

In the cylinder head gasket in accordance with FIG. 7, the carrier sheet 526 has in the region of a ring zone 526a a greater rigidity that counteracts sagging of the carrier sheet 526 than in the two regions of the carrier sheet 526 adjoining this ring zone. The greater rigidity of the ring zone 526a was brought about by providing it with a cross-sectional deformation 526a', in the region of which the geometrical moment of inertia of the carrier sheet 526 is greater than in the adjoining regions. In the preferred embodiment shown, the cross-sectional deformation 526a' has the shape of a groove or bead, in particular, a trapezoidal bead, embossed in the carrier sheet 526, which encloses the combustion chamber opening 14 in the shape of a circular ring and, in accordance with the invention, projects in the direction towards the first functional layer 520 and lies opposite a sealing bead 520a of the first functional layer, namely such that when the cylinder head gasket is installed and pressed, the crest of the sealing bead 520a lies against a crest formed by this groove or bead. In accordance with a further feature of the invention, the bead feet of a sealing bead 522a of a second functional layer 522 lie outside the cross-sectional deformation 526a' (seen in a plan view of the cylinder head gasket), namely in relation to the axis 14a of the combustion chamber opening 14 radially inside and radially outside, respectively, the cross-sectional deformation 526a'. On the other hand, it is advantageous for the two bead feet of the sealing bead 522a to have only a relatively small radial spacing from the cross-sectional deformation 526a' (again seen in a plan view of the cylinder head gasket). All sealing beads and possibly also the cross-sectional deformation 526a' are preferably designed mirror-symmetrically in relation to the surface 527 of a circular cylinder extending concentrically with the axis 14a.

One or more or all of the sealing beads 520a, 522a and 524a could, however, also each be formed by two half beads.

Figure 8:
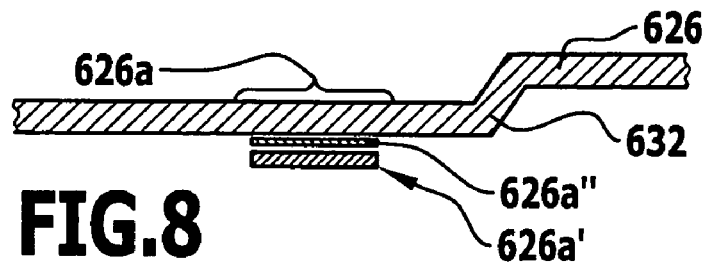

FIG. 8 shows only a section of a carrier sheet 626 of a cylinder head gasket according to the invention, which apart from the part of the carrier sheet shown in FIG. 8, may be designed in exactly the same way as the cylinder head gasket in accordance with FIG. 7.

The part of the carrier sheet 626 shown in FIG. 8 comprises a ring zone 626*a*, which corresponds to the ring zone 526*a* of the cylinder head gasket in accordance with FIG. 7, and in the region of which the carrier sheet 626 is provided with a thin ring-shaped covering 626*a*' made of a material of high tensile strength instead of with a cross-sectional deformation corresponding to the cross-sectional deformation 526*a*'. The covering 626*a*' is joined throughout its entire surface with a substance-to-substance bond to the carrier sheet 626, for example, by adhesion or welding, and an adhesive layer 626*a*" is shown by way of example in FIG. 8. The flexural rigidity of the carrier sheet in the region of its ring zone 626*a* is increased by the covering 626*a*' joined to the carrier sheet 626 so as to prevent or minimize arching of the carrier sheet in the region of the ring zone 626*a* when a sealing bead of a functional layer is pressed from below against the covering 626*a*' when the cylinder head gasket is installed.

The embodiments of further cylinder head gaskets according to the invention shown schematically in FIGS. 9 and 10 differ from the cylinder head gasket in accordance with FIG. 7 only in the configuration of a ring zone of the carrier sheet, and, therefore, the same reference numerals were used in FIGS. 9 and 10 as in FIG. 7, but increased by 200 and 300, respectively, and the embodiments in accordance with FIGS. 9 and 10 will only be described hereinbelow insofar as these gaskets differ from that in accordance with FIG. 7.

Figure 9:
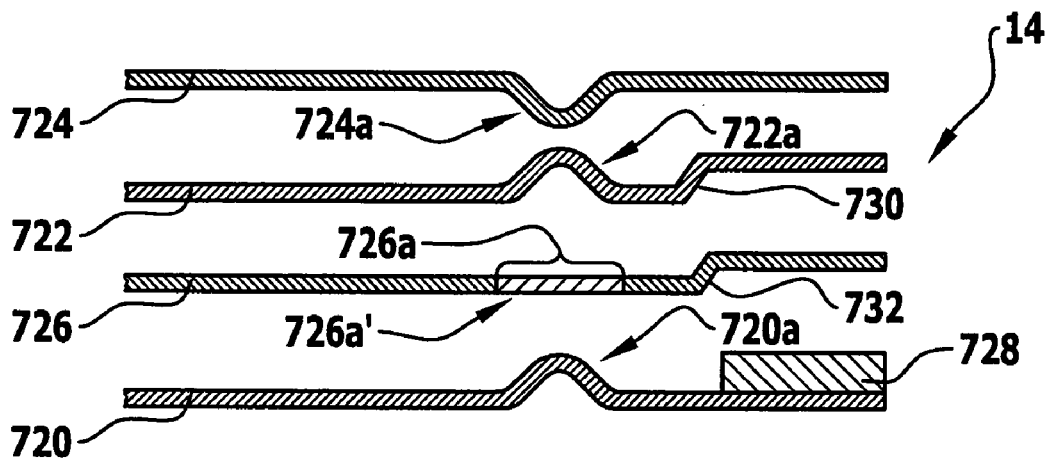

In the embodiment in accordance with FIG. 9, the carrier sheet 726 has in the region of a ring zone 726*a* of the carrier sheet, which lies between sealing beads 720*a* and 722*a* of the first functional layer 720 and the second functional layer 722, respectively, an insert 726*a*' in the form of a flat ring which encloses the combustion chamber opening 14 and is made of a material having a higher modulus of elasticity than the material of the carrier sheet 726.

Figure 10:
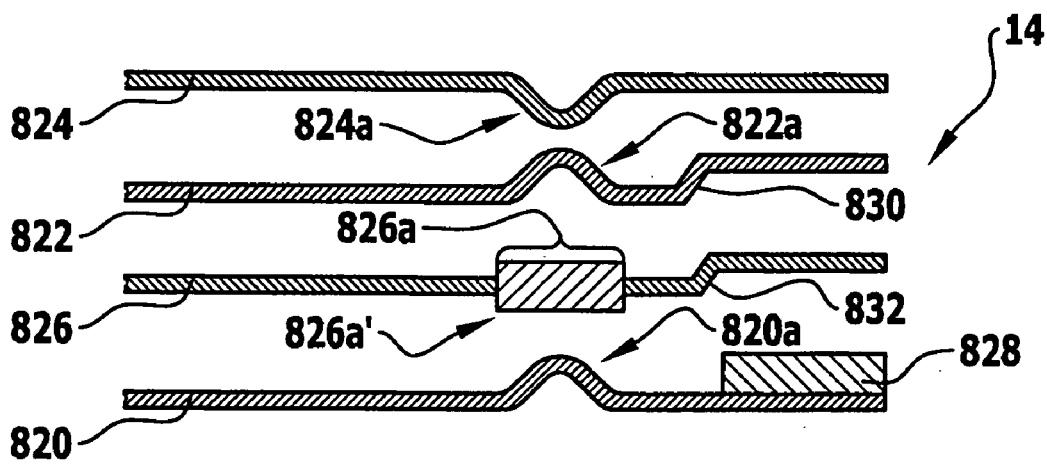

In the embodiment in accordance with FIG. 10, in a ring zone 826*a* of the carrier sheet 826 an insert 826*a*' in the form of a ring which encloses the combustion chamber opening 14 and has a greater flexural rigidity than the regions of the carrier sheet 826 adjoining the insert 826*a*' takes the place of the insert 726*a*'.

The inserts 726*a*' and 826*a*' may, if they consist of a metallic material, be welded in between portions of the carrier sheet 726 and 826, respectively, lying radially inside and radially outside the respective insert. In principle, it is, however, also conceivable to modify the material of the carrier sheet 726 in the region of the ring zone 726*a* in such a way that the carrier sheet has a higher modulus of elasticity there than in adjoining regions.

In the embodiment in accordance with FIG. 10, the carrier sheet 826 could be clamped on either side of the subsequent ring zone 826*a*, then compressed in radial direction and finally shaped approximately as shown in FIG. 10 by press forming so as to form the ring zone 826*a* by a sheet metal ring of larger thickness.

In the cylinder head gaskets in accordance with FIGS. 9 and 10, a sealing bead or a plurality of sealing beads or all of the sealing beads could also each be formed by two half beads.

The invention claimed is:

1. A cylinder head gasket with a gasket plate defining a gasket plane and comprising a plurality of sheet metal layers arranged one over the other, and having at least one combustion chamber opening, said plurality of sheet metal layers, comprising a first functional layer having a first ring zone enclosing said combustion chamber opening and defining a first plane parallel to the gasket plane, and a radially inner half sealing bead and a radially outer half sealing bead formed within said first ring zone and being radially spaced from one another, each of said half-beads having a bead foot lying in said first plane and a bead crest projecting over said first plane in a first direction perpendicularly to said gasket plane, a second functional layer having a second ring zone enclosing said combustion chamber opening and defining a second plane parallel to said first plane, and a sealing bead formed within said second ring zone and having two bead feet lying in said second plane and at least one bead crest projecting over said second plane in said first direction, and an inner layer arranged directly between said first and second functional layers, said inner layer having a third ring zone enclosing the combustion chamber opening, wherein, in a plan view of the cylinder head gasket, the crests of said radially inner and outer half-beads of the first functional layer lie in relation to the inner layer approximately opposite the bead feet of the sealing bead of the second functional layer, and wherein, when the cylinder head gasket is installed, said third ring zone is clamped between the crests of said radially inner and outer half-beads and the bead feet of the sealing bead of the second functional layer so that those regions of the third ring zone which are pressed against the bead feet of the sealing bead of the second functional layer are supported by the crests of said half-beads of the first functional layer.

2. The cylinder head gasket in accordance with claim 1, wherein the second functional layer has a full bead whose bead feet lie approximately opposite the bead crests of the two half beads of the first functional layer.

3. The cylinder head gasket in accordance with claim 1, wherein the second functional layer has two half beads whose bead feet lie approximately opposite the bead crests of the two half beads of the first functional layer.

4. The cylinder head gasket in accordance with claim 1, wherein the gasket plate comprises a third functional layer with a full bead or two half beads, which encloses or enclose the combustion chamber opening and whose crest or crests projects or project in the direction opposite to the first direction over the third functional layer, the beads of the three functional layers being formed approximately mirror-symmetrically in relation to the surface of a circular cylinder which is coaxial with the combustion chamber opening, and the third functional layer being arranged outside the set of layers formed by the two other functional layers and the inner layer.

5. The cylinder head gasket in accordance with claim 4, wherein the third functional layer is arranged adjacent to that one of the two other functional layers, the bead feet of the two other functional layers lying against the inner layer when the cylinder head gasket is installed.

6. The cylinder head gasket in accordance with claim 5, wherein the third functional layer and one of the two other functional layers form outer layers of the cylinder head gasket.

7. The cylinder head gasket in accordance with claim 6, wherein the third functional layer forms the main surface of the cylinder head gasket that is to face a cylinder head.

8. The cylinder head gasket in accordance with claim 4, wherein the third functional layer is arranged adjacent to that one of the two other functional layers whose bead projects in the direction towards the inner layer.

9. The cylinder head gasket in accordance with claim 8, wherein the three functional layers and the inner layer are arranged between outer layers of the cylinder head gasket, which, at least in regions covering the beads, are flat.

* * * * *